United States Patent [19]

Quinn et al.

[11] Patent Number: 4,780,114

[45] Date of Patent: Oct. 25, 1988

[54] MOLTEN SALT HYDRATE MEMBRANES FOR THE SEPARATION OF GASES

[75] Inventors: Robert Quinn, East Texas; Guido P. Pez, Allentown; John B. Appleby, Lansdale, all of Pa.

[73] Assignee: Air Products and Chemicals, Inc., Allentown, Pa.

[21] Appl. No.: 108,501

[22] Filed: Oct. 14, 1987

[51] Int. Cl.$^4$ .............................................. B01D 53/22
[52] U.S. Cl. ........................................ 55/16; 55/70; 55/71; 55/73; 55/158; 423/210.5; 423/244
[58] Field of Search ................... 55/16, 33, 68, 70, 71, 55/73, 158; 423/210.5, 215.5, 243, 244

[56] References Cited

U.S. PATENT DOCUMENTS

| | | | |
|---|---|---|---|
| 2,983,767 | 5/1961 | Fleck et al. ......................... | 55/16 X |
| 3,155,467 | 11/1964 | Yamamoto et al. .................... | 55/16 |
| 3,335,545 | 8/1967 | Robb et al. ........................ | 55/16 |
| 3,396,510 | 8/1968 | Ward III et al. ................... | 55/16 |
| 3,400,054 | 9/1968 | Ruka et al. ........................ | 204/1 |
| 3,432,363 | 3/1969 | Gillis ............................. | 136/153 |
| 3,447,286 | 6/1969 | Dounoucos ......................... | 55/16 |
| 3,503,186 | 3/1970 | Ward III .......................... | 55/16 |
| 3,527,618 | 9/1970 | Bushnell .......................... | 136/86 |
| 3,676,220 | 7/1972 | Ward III .......................... | 55/158 X |
| 3,727,058 | 4/1973 | Schrey ........................... | 250/83.3 H |
| 3,819,806 | 6/1974 | Ward III et al. ................... | 423/229 |
| 3,847,672 | 11/1974 | Trocciola et al. .................. | 55/16 X |
| 4,014,665 | 3/1977 | Steigelmann ....................... | 55/16 |
| 4,015,955 | 4/1977 | Steigelmann et al. ................ | 55/16 |
| 4,119,408 | 10/1978 | Matson ............................ | 422/169 |
| 4,132,766 | 1/1979 | Erickson .......................... | 423/219 X |
| 4,147,754 | 4/1979 | Ward III .......................... | 423/224 |
| 4,174,374 | 11/1979 | Matson ............................ | 423/232 |
| 4,207,298 | 6/1980 | Erickson .......................... | 423/210.5 |
| 4,317,865 | 3/1982 | Trocciola et al. .................. | 429/41 |
| 4,318,714 | 3/1982 | Kimura ............................ | 55/16 |
| 4,396,572 | 8/1983 | Batigne et al. .................... | 264/510 |
| 4,617,029 | 10/1986 | Pez et al. ........................ | 55/16 |
| 4,701,186 | 10/1987 | Zampini ........................... | 55/16 X |
| 4,708,860 | 11/1987 | Weimer ............................ | 423/210.5 X |
| 4,710,205 | 12/1987 | Deetz et al. ...................... | 55/16 X |

FOREIGN PATENT DOCUMENTS 2082156 3/1962 United Kingdom .

OTHER PUBLICATIONS

J. Membrane Science, 12, (1982), 239–259, "Liquid Membrane Transport: A Survey", J. Douglas Way et al.
Biochemica et. Biophysica Acta, vol. 211, (1970), pp. 194–215, "Nonequilibrium Facilitated Diffusion of Oxygen through Membranes of Aqueous Cobaltodihistidine", R. F. Bassett et al.

*Primary Examiner*—Robert Spitzer
*Attorney, Agent, or Firm*—Mark L. Rodgers; William F. Marsh; James C. Simmons

[57] ABSTRACT

The present invention is a membrane and a process for separating at least one component from at least one other component in a gas mixture. A gaseous mixture is passed over a membrane having a thin film of a molten salt hydrate which is selectively permeable to at least one component in the gaseous mixture.

26 Claims, No Drawings

MOLTEN SALT HYDRATE MEMBRANES FOR THE SEPARATION OF GASES

TECHNICAL FIELD OF THE INVENTION

The present invention relates to gas separation processes using membranes which are highly permeable yet selective to the passage of a particular component of a gaseous mixture.

BACKGROUND OF THE INVENTION

Numerous approaches to the separation of a gas from a mixture of gases by differential permeation have been investigated. Robb, et al., in U.S. Pat. No. 3,335,545, have proposed use of a liquid, entrapped in a porous or permeable support, to separate mixtures of gases. The use of a so-called "quasi-liquid film" for example, diethylene glycol, in a support has permitted separation of carbon dioxide from nitrogen, hydrogen or oxygen, the selectivity being somewhat higher than would be predicted on the basis of the molecular weights of the gases as the sole factor influencng separation. Ward, III, has proposed, in U.S. Pat. No. 3,503,186, a similar procedure for separating sulfur dioxide from other gases.

The use of facilitated transport liquid membranes has been reviewed by Way, et al., *J. Membrane Science*, vol. 12 (1982), pages 239–259. Another typical disclosure of gas separation using a facilitated transport immobilized membrane is that of Bassett, at al., *Biochemica et Biophysica Acta*, vol 211 (1970), pages 194–215. Facilitated transport of gases through liquid membranes is also recited for example, in the following U.S. Patents:

| | |
|---|---|
| 3,396,510 | Ward, III, et al. |
| 3,676,220 | Ward, III |
| 3,819,806 | Ward, III, et al. |
| 4,014,665 | Steigelmann |
| 4,015,955 | Steigelmann, et al. |
| 4,119,408 | Matson |
| 4,147,754 | Ward, III |
| 4,174,374 | Matson |

Ward, III, et al. U.S. Pat. No. 3,396,510 recite using an immobilized liquid film as a permeable membrane, wherein the liquid film contains at least one soluble, non-volatile, dissolved carrier species, which is reversibly chemically reactive with a selected component of a gaseous mixture.

Ward, III, et al. U.S. Pat. No. 3,819,806 discloses the formation of an immobilized liquid membrane for the separation of an acid gas from other components of a gas stream. Transport of the acid gas through the immobilized liqud membrane is facilitated by the addition of a water-soluble salt to the liquid membrane.

Steigelmann U.S. Pat. No. 4,014,665 discloses a membrane-liquid barrier system having a complex-forming, silver-containing ion component in an aqueous solution. The membrane-liquid barrier combination can be used to separate olefinically-unsaturated hydrocarbons from mixtures containing them and other components, such as alkanes.

Kmuria et al. (U.S. Pat. No. 4,318,714) have recited using an ion-exchange membrane to accomplish facilitated separation of a gas from a mixture of gases.

Yamamoto et al. (U.S Pat. No. 3,155,467) have disclosed separation and purification of hydrogen, using a palladium alloy as a permeable wall structure.

Solid and molten salt electrolytes have been disclosed, in the fuel cell or electrochemical arts, in the following representative patents:

| | |
|---|---|
| 3,400,054 | Ruka et al. |
| 3,432,363 | Gillis |
| 3,527,618 | Bushnell |
| 3,727,058 | Schrey |
| 4,317,865 | Trocciola et al. |
| U.K. 2,082,156 | Yoshisato et al. |

A limiting feature in many of these disclosures is that a gas should not completely permeate the electrolyte or electrode, since complete penetration could short circuit the device.

Batigne et al.. U.S. Pat. No. 4,396,572. recite using a porous ceramic barrier, having a plurality of superimposed layers of pastes of varying composition, to separate uranium hexafluoride isotopes by ultrafiltration.

Fleck, U.S. Pat. No. 2,983,767, teaches separating a fluid mixture of organic compounds by passing the mixture over a diffusion barrier containing a specified Werner metal complex in the form of a crystalline solid which forms a clathrate inclusion compound with one or more components of the fluid.

Erickson, U.S. Pat. No. 4,132,766 teaches a process for separating oxygen from air by contacting the air with an oxygen acceptor comprised of a molten solution of alkali nitrite and nitrate salts at elevated temperature and pressure to react with the oxygen. The oxygen is subsequently recovered by reducing the pressure while supplying heat to the salt solution.

Trocciola. et al., U.S. Pat. No. 3,847,672 discloses a fuel cell system comprising a gas separator. The gas separator comprises a tile or block of salt in a molten or solid state having opposed reactive surfaces. A gas stream containing hydrogen and carbon dioxide is fed to one surface of the salt at which surface the $CO_2$ is chemically taken up by the salt. A sweep or stripping gas is maintained at the downstream surface of the salt tile at which surface $CO_2$ is released.

Dounoucos, U.S. Pat. No. 3,447,286 discloses a totally enclosed liquid membrane for the separation of gases. The membrane comprises a porous body having direct channels extending therethrough from face to face and providing an open area completely enclosed together with a selected liquid filling the channels between non-porous layers of solid permselective membrane material.

Pez, et al., U.S. Pat. No. 4,617,029 teaches a process for separating a gas from a mixture of gases by passing the gas mixture over a membrane selectively permeable by the gas being separated, owing to the occurrence of one or more reversible oxidation-reduction reactions between the gas being separated and a continuous layer of active molten material immobilized in a rigid, porous, inert support.

BRIEF SUMMARY OF THE INVENTION

The present invention is a process for separating at least one component from at least one other component in a gaseous mixture by passing the gaseous mixture over a membrane selectively permeable to the gas being separated, which membrane comprises a thin film of a molten salt hydrate. The molten salt hydrate may be immobilized within the pores of a thin, porous inert support or alternatively, may be encapsulated in a non-porous, gas permeable polymer or polymer blend material.

Generally, the molten salt hydrates comprise a cationic species, an anionic species and water, and membranes comprising such hydrates are typically well suited for separations such as the separation of $CO_2$ from $CH_4$ and $H_2$, $H_2S$ from $CH_4$ and $H_2$, olefin gases from alkanes and also for the separation of water vapor from air or nitrogen.

DETAILED DESCRIPTION OF THE INVENTION

The present invention involves the use of molten salt hydrates supported in porous supports or encapsulated in polymeric materials as membranes for gas separations.

Molten salt hydrates can be used to fabricate immobilized and/or encapsulation molten salt hydrate membranes. The molten salt hydrate material either as a single component or with a limited amount of added water can be immobilized within the pores of a thin, porous inert support, or a film of the hydrate may simply be layered on a relatively gas permeable polymer. Alternatively, the hydrate material may be encapsulated in a non-porous, gas permeable polymer or polymer blend material such as poly(4-methyl-1-pentene), poly(trimethylsilylpropyne) or silicone rubber.

Typically, a salt can be defined as a substance which is comprised of cations and anions and which is characterized by overall electrical neutrality. A salt hydrate is a salt which contains bound water. The composition of a salt hydrate is usually represented by a formula of the form $A_xB_y \cdot nH_2O$ where A and B are ionic species of opposite charge and n is the number of moles of bound water per mole of salt. The term "salt hydrate" does not indicate the manner or degree of tenacity by which the water molecules are held to the salt. However, it has been suggested that salt hydrates do not contain water in excess of the primary hydration sphere of the ions.

Many salts exist as hydrates and upon heating, melt to yield liquid systems which contain bound water. Such systems are known as "molten salt hydrates" or "hydrate melts" (see Angell, C. A.; Green, D. M. *J. Am. Chem. Soc.* 88, 5192 (1966) and may be viewed as comprising a special class within the broad area of molten salts. Examples of substances which yield molten salt hydrates are $MgCl_2 \cdot 6H_2O$ (melting point (m.p.) 117° C.), $Ca(NO_3)_2 \cdot 4H_2O$ (m.p. 39° C.) and $CaCl_2 \cdot 6H_2O$ (m.p. 29°C.).

It is important to emphasize that "hydrate melts" are not merely concentrated aqueous solutions. As described by H. H. Emons, *Oester, Chem. Z.*, 87, 3-9 (1986), hydrate melts supply "a link between (aqueous) electrolyte solutions and salt melts." Melt hydrates are viewed as containing the minimum quantity of water to fill the primary hydration sphere of the ions. Hence, hydrate melts are generally considered to contain approximately 0.1 to 0.25 mole fraction of salt or, conversely, approximately 3-9 moles of $H_2O$ per mole of salt. In view of this, the existence of molten salt hydrates with a range of 1-12 moles of water per mole of salt is conceivable. Since water in excess of the primary hydration spheres is absent, direct water-ion interactions dominate and, unlike aqueous solutions, exclusive $H_2O$—$H_2O$ interactions are absent. Such fundamental differences are reflected in various thermodynamic and other properties such as $\Delta H$ of evaporation, conductivity and partial molar dilution enthalpy.

The present invention relates to the use of molten salt hydrates in membrane systems i.e., in immobilized and/or encapsulated melt hydrate membranes for gas separation processes. We have found such melt hydrate membranes to be particularly useful for the separation of $CO_2$ from $CH_4$ and $H_2$, $H_2S$ from $CH_4$ and $H_2$, olefin gases from alkanes, and of water vapor from $N_2$ and other permanent gases, although they are also well suited for separating a wide variety of other gases, such as $SO_2$, $NH_3$, HF, HCl, HBr, $H_2S$, olefins such as $C_2H_4$ and $C_3H_6$, and mixtures thereof from a wide variety of feed gases.

Molten salt hydrate membranes are typically used for separating the components of a gas mixture by passing the gas mixture over the feed side of the membrane and recovering a gas stream which is enriched with the desired product at the permeate side. The permeate gases may be collected directly or alternatively their recovery may be facilitated by sweeping the permeate side with an inert gas. In most cases, for the effective operation of the membrane, it may be necessary to have at least a minimal partial vapor pressure of water; i.e., a minimal level of humidity in either the feed or permeate sweep streams to the membrane in order to retain the active molten salt hydrate composition.

There are at least two advantages to the use of molten salt hydrates in membranes over simple molten salts for certain gas separations. First, the melting point of the hydrate is generally much lower than that of the anhydrous salt. For example, the melting points of $FeCl_3$ and $FeCl_3 \cdot 6H_2O$ are 306° C. and 37° C., respectively. Secondly, many gases react reversibly with water, undergo reversible chemical reactions in the presence of water or are quite soluble in water. Hence, a selective permeation of such gases can be achieved by using molten salt hydrate membranes. Carbon dioxide is one such gas. $CO_2$ is quite soluble in water and reacts with water via equation (1) as follows:

$$H_2O + CO_2 \rightleftharpoons HCO_3^- + H^+ \quad (1)$$

However, the thermodynamics and kinetics of the reaction of $CO_2$ with $OH^-$ (reaction (2)) are more favorable than those of reaction (1).

$$OH^- + CO_2 \rightleftharpoons HCO_3^- \quad (2)$$

In molten salt hydrate media, $OH^-$ can be generated by reaction of $H_2O$ with basic anions:

$$B^- + H_2O \rightleftharpoons BH + OH^- \quad (3)$$

Hence, a molten salt hydrate containing a basic anion B should facilitate transport of $CO_2$ via equations (1) and (2) and act as a "salt water" barrier to gases which are inert with respect to $H_2O$ (e.g., $CH_4$, $N_2$, $H_2$, etc.). It is envisaged that molten salt hydrate membranes containing moderately basic anions such as acetate, trifluoroacetate, formate, benzoate, glycinate, fluoride, carbonate, sulfite, sulfide and hydrogen sulfide ($HS^-$) may be particularly useful. The use of tetramethylammonium fluoride tetrahydrate and tetraethylammonium acetate tetrahydrate in the fabrication of immobilized molten salt hydrate membranes for the separation of $CO_2$ from $CH_4$ and $CO_2$ from $H_2$ is described in Examples 1-5 below. One major advantage of the present invention is that gases such as $CH_4$ and, particularly, $H_2$ can be retained at feed pressures thus eliminating recompression costs. By contrast, conventional polymeric membranes readily permeate H₂ and the gas must be recompressed. Some moisture-saturated cellulose-based membranes permeate CO₂ more rapidly than H₂ through essentially a water film barrier but the ratio of the CO₂ to H₂ permeabilities are quite low (∼10) in comparison with the present invention.

In addition to CO₂ and water vapor, other gases such as SO₂, NH₃, HF, HCl, HBr, HCN, and H₂S which react or interact reversibly with H₂O, undergo reversible chemical reactions in water, or have high solubilities in H₂O may be well suited to separations via immobilized molten salt hydrate membranes. For example, SO₂ is quite soluble in water and undergoes the hydration reaction in (4):

$$H_2O + B^- + SO_2 \rightleftharpoons HSO_3^- + BH \qquad (4)$$

Roberts and Friedlander, AIChE Journal, 26, 593-610 (1980) have investigated the transport of SO₂ through films of water and neutral aqueous solutions and have shown that 83 to 95% of the flux of SO₂ results from hydration as in Equation (5).

$$2H_2O + SO_2 \rightleftharpoons HSO_3^- + H_3O^+ \qquad (5)$$

In basic media, such as a solution containing NaOH, NaHSO₃ and Na₂SO₃, the flux of SO₂ was found to be 28 times as great as in pure water. Hence, immobilized molten salt hydrate membranes with weakly basic anions appear ideally suited for separations involving SO₂. Accordingly, the molten salt hydrates suggested for use involving separations of CO₂ may be used for SO₂ separations as well.

As a second example, hydrogen sulfide may be expected to react reversibly with molten salt hydrates containing weakly basic anions (B⁻) by the equation:

$$H_2S + B^- \rightleftharpoons BH + HS^- \qquad (6)$$

thus resulting in a facilitated transport of the gas.

Immobilized molten salt hydrate membranes can also be applied to separations which exploit the relatively low melting point of salt hydrates rather than the reactivity (or solubility) of gases with waters of hydration. An example of such a membrane utilizes the silver ions contained in a molten salt hydrate to reversibly complex and thus facilitate transport of olefins to effect a separation from saturated hydrocarbons, such as the separation of C₂H₄ from C₂H₆.

Molten salt hydrates react (or interact) reversibly with H₂O and, thus, are ideal materials for the fabrication of membranes for the separation of water vapor from nitrogen, air, hydrocarbons or other non-polar gases. The use of tetraethylammonium acetate tetrahydrate for this purpose is described in Examples 4 and 5 below.

The disadvantage of prior art immobilized aqueous solutions which renders them impractical is their tendency to dehydrate, even at room temperature, and become ineffective. It has been shown that molten salt hydrate membranes, even at 50° C., retain their liquidity and are effective when exposed to feed and sweep gases with dew points of 0°-20° C. Under analogous conditions. one would expect an immobilized aqueous solution membrane to dehydrate. The difference between the two systems is believed to arise from a greater reduction of the water vapor pressure above a molten salt hydrate than above an aqueous solution.

Calculations and Data Presentation

The flux of a particular gas passing through the membrane is determined from its concentration in the controlled flow of helium which sweeps the permeate side of the membrane. Membrane performance is expressed in terms of the standard permeability, Po, for each gas. Po is defined as the experimental flux J, (sccm sec⁻¹), per unit area A (cm²) of membrane surface and unit pressure differential ΔP (cmHg) of the particular gas between the two interfaces of the membrane multiplied by the thickness (l) of the membrane. Values of Po have been corrected for the porosity and the tortuosity of the polymeric porous support.

$$Po = \frac{J \cdot P \cdot \text{tortuosity}}{A \cdot \Delta p \cdot \text{porosity}}$$

in units of sccm.cm/cm².s.cmHg.

Values of Po are expressed in Barrers; 1 Barrer = 1 × 10⁻¹⁰ sccm.cm/cm².s.cmHg. The thickness of the active layer was used in the calculation of Po for encapsulated membranes. This assumes that the gas permeance of the encapsulating polymer is much greater than that of the active membrane element, which in most cases is a valid assumption.

The following examples are presented to illustrate the present invention and are not meant to be limiting.

EXAMPLE 1

An immobilized Tetramethylammonium Fluoride Tetrahydrate, (CH₃)₄NF.4H₂O (TMAF) Molten Salt Hydrate Membrane for the Separation of CO₂ from CH₄.

Tetramethylammonium fluoride tetrahydrate (obtained from Aldrich Chemical Co.) in the molten state (M.P. = 39°-42° C.) was used to fabricate an immobilized molten salt hydrate membrane to separate CO₂ from CH₄. This membrane was prepared in the following manner. An aqueous solution of (CH₃)₄NF₄.4H₂O, ≈4M, was applied to a film of Celgard 3501 (Celanese Corp.). The impregnated polymer was dried in vacuum at room temperature for about one hour. The resulting film was placed in a holder and sealed in a permeation test cell and heated to 50° C. Humidified CO₂/CH₄ feed and He permeate sweep gases were used. Experimental conditions and membrane performance data are listed in Table I below.

TABLE I

PERFORMANCE OF IMMOBILIZED TMAF/CELGARD MOLTEN SALT HYDRATE MEMBRANES FOR THE SEPARATION OF CO₂ FROM CH₄ at 50° C.

| FEED GAS FLOW: 20 SCCM | | PERMEATE GAS He FLOW: 10 SCCM; P = 76 cm | | |
|---|---|---|---|---|
| $P_{CO_2}$ (cmHg) | $P_{CH_4}$ (cmHg) | $P_o(CO_2)$ (Barrers) | $P_o(CH_4)$ (Barrers) | ∝ CO₂/CH₄* |
| 44 | 42 | 306 | 3 | 102 |
| 92 | 88 | 197 | 3 | 66 |
| 188 | 181 | 135 | 3 | 45 |
| 264 | 253 | 133 | 3 | 32 |

*∝ = selectivity

The observed drop in the standard permeability of CO₂ with increasing partial pressure of carbon dioxide in the feed is consistent with a CO₂ carrier mediated facilitated transport mechanism. The reversible interaction of $CO_2$ with a species in the melt and transport of the $C_2$-carrier complex across the membrane is indicated by the above results.

EXAMPLE 2

An encapsulated Tetramethylammonium Fluoride Tetrahydrate, $(CH_3)_4NF \cdot 4H_2O$, Molten Salt Hydrate Membrane for the Separation of $CO_2$ from $CH_4$.

The salt hydrate, tetramethylammonium fluoride tetrahydrate, $(CH_3)_4NF \cdot 4H_2O$, (TMAF), in the molten state ($>39°$ C.), was used to fabricate an encapsulated membrane for separating $CO_2$ from $CH_4$. This membrane was prepared in the following manner. Molten TMAF (at ca. 50° C.) was applied to a slightly moistened piece of Celgard 3501 and the excess salt was removed. This TMAF/Celgard was placed between two films of polytrimethylsilylpropyne (PTMSP) (130 and 112 μm). The membrane was placed in a holder, sealed in a permeation cell and heated to 50° C. Since TMAF solidifies if dehydrated, both feed and sweep gases were humidified by passage through water bubblers at room temperature. Experimental conditions and results are detailed in Table II below. Values of the standard permeability, Po, were calculated assuming that only the TMAF/Celgard layer was responsible for gas permeation.

It is fairly certain that under the conditions of this and the previous membrane experiment (Ex. 1) that at 50° C. using moist feed and permeate sweep gases, the salt remains as a molten hydrate. In fact, heating $(CH_3)_4NF \cdot 4H_2O$ to 100° C. under a flow of dry $N_2$, results in loss of only 1.8 moles $H_2O$ per mole of salt.

TABLE II

PERFORMANCE OF ENCAPSULATED TMAF/CELGARD MEMBRANES FOR THE SEPARATION OF $CO_2$ FROM $CH_4$ AT 50° C.

| FEED GAS FLOW: 20 SCCM | | PERMEATE GAS He FLOW: 10 SCCM; P = 76 cm | | |
|---|---|---|---|---|
| $P_{CO_2}$ (cmHg) | $P_{CH_4}$ (cmHg) | $P_o(CO_2)$ (Barrers) | $P_o(CH_4)$ (Barrers) | $\alpha\, CO_2/CH_4$ |
| 43 | 41 | 755 | 6.1 | 124 |
| 81 | 77 | 638 | 6.4 | 100 |
| 119 | 114 | 545 | 6.7 | 81 |
| 199 | 191 | 421 | 7.3 | 58 |
| 244 | 234 | 381 | 12.2 | 31 |
| 371 | 355 | 318 | 13.3 | 24 |

As in Example 1, the decrease in the standard permeability of $CO_2$ with increasing partial pressure of $CO_2$ in the feed is consistent with and thereby indicates, a $CO_2$ carrier mediated facilitated transport mechanism.

Example 3

An Immobilized Tetraethylammonium Acetate Tetrahydrate $(C_2H_5)_4N^+CH_3CO_2^- \cdot 4H_2O$, (TEAA), Molten Salt Hydrate Membrane for the Separation of $CO_2$ from $CH_4$.

Tetraethylammonium acetate tetrahydrate in the molten state was used to fabricate a membrane which separates $CO_2$ from $CH_4$. The membrane was prepared in the following manner. Molten TEAA was applied to a piece of Celgard 3501 and the excess salt was removed. The TEAA/Celgard was placed in a holder and sealed in a permeation cell and heated to 50° C. The feed gas, 1:1 $CO_2$:$CH_4$ and the sweep gas, He, were passed through water bubblers at 25° C. Experimental conditions and membrane performance data are listed in Table III below.

TABLE III

PERFORMANCE OF IMMOBILIZED TEAA/CELGARD MOLTEN SALT HYDRATE MEMBRANES FOR THE SEPARATION OF $CO_2$ from $CH_4$ at 50° C.

| FEED GAS FLOW: 20 SCCM | | PERMEATE GAS He FLOW: 10 SCCM; P = 76 cm | | |
|---|---|---|---|---|
| $P_{CO_2}$ (cmHg) | $P_{CH_4}$ (cmHg) | $P_o CO_2$ (Barrers) | $P_o(CH_4)$ (Barrers) | $\alpha\, CO_2/CH_4$ |
| 38.8 | 37.2 | 157 | 8 | 20 |

The above results show a good separation factor (selectivity) for $CO_2$ and a low standard permeability (Po) for $CH_4$.

EXAMPLE 4

An Immobilized Tetramethylammonium Fluoride Tetrahydrate, $(CH_3)NF \cdot 4H_2O$, (TMAF), Molten Salt Hydrate Membrane for the Separation of $CO_2$ from $CH_4$ and $H_2$.

The salt hydrate, tetramethylammonium fluoride tetrahydrate $(CH_3)_4NF \cdot 4H_2O$, (TMAF), in the molten state was used to fabricate a membrane which separates $CO_2$ from $CH_4$ and $H_2$. This membrane was prepared in the following manner. An aqueous solution of $(CH_3)_4NF \cdot H_2O$, $\approx 4M$, was applied to a film of Celgard 3401. The impregnated support was dried under vacuum at room temperature for about one hour and subsequently soaked in molten TMAF at $\approx 50°$ C. for 5 minutes. Following removal of the excess molten salt, the membrane was placed in a membrane test cell and heated to 50° C.

Feed and sweep gases were humidified by passage through water bubblers at 23° C. Experimental conditions and membrane performance data are listed in Table IV below.

TABLE IV

PERFORMANCE OF IMMOBILIZED TMAF/CELGARD MOLTEN SALT HYDRATE MEMBRANES FOR THE SEPARATION OF $CO_2$ FROM $CH_4$ AT 50° C.

| FEED GAS FLOW: 20 SCCM | | | PERMEATE GAS He FLOW: 10 SCCM; P = 76 cm | | | | |
|---|---|---|---|---|---|---|---|
| $P_{H_2}$ (cmHg) | $P_{CO_2}$ (cmHg) | $P_{CH_4}$ (cmHg) | $P_o(H_2)$ (Barrers) | $P_o(CO_2)$ (Barrers) | $P_o(CH_4)$ (Barrers) | $\alpha\, CO_2/H_2$ | $\alpha\, CO_2/CH_4$ |
| 43.1 | 21.1 | 20.1 | 51 | 452 | 11 | 9 | 41 |
| 96.9 | 47.3 | 45.0 | 66 | 320 | 12 | 5 | 27 |
| 171.8 | 83.9 | 79.9 | 58 | 230 | 12 | 4 | 19 |
| 301.8 | 147.3 | 140.3 | 40 | 162 | 12 | 4 | 14 |

Much of the permeability of $H_2$ may arise from permeation through the non-porous portion of Celgard 3401. The permeability of $H_2$ through polypropylene (Celgard 3501) is 41 Barrers. As in the above examples, this example shows a good separation of $CO_2$.

EXAMPLE 5

A Supported Molten Tetramethylammonium Fluoride Tetrahydrate Film for the Separation of $CO_2$ from $CH_4$ and $H_2$.

The salt hydrate, tetramethylammonium fluoride tetrahydrate, was melted upon the surface of a film of poly(trimethylsilylpropyne) (PTMSP) secured in a suitable holder. The holder and membrane were sealed in a membrane test cell and heated to 50° C. Feed and sweep gases were humidified by passage through water bubblers at 5° C. Experimental conditions and membranes performance data (2 runs) are listed in Table V below. P/l values rather tha Po are reported since the thickness of the salt layer is unknown.

TABLE V

Performance of Molten TMAF on the Surface of PTMSP For Separation of $CO_2$ from $CH_4$ and $H_2$ at 50° C.

| FEED GAS FLOW: 20 SCCM | | | PERMEATE GAS He FLOW: 10 SCCM; P = 76 cm | | | | |
|---|---|---|---|---|---|---|---|
| $P_{H_2}$ (cmHg) | $P_{CO_2}$ (cmHg) | $P_{CH_4}$ (cmHg) | P/l × $10^8$ ($cm^3/cm^2 \cdot cmHg \cdot sec$) | | | $\alpha CO_2/H_2$ | $\alpha CO_2/CH_4$ |
| | | | $H_2$ | $CO_2$ | $CH_4$ | | |
| | | | 1st RUN | | | | |
| 47.1 | 23.0 | 21.9 | N.O.* | 2970 | 8.4 | — | 350 |
| 100 | 48.7 | 46.7 | 43 | 2120 | 11 | 49 | 200 |
| 167 | 81.6 | 77.6 | 52 | 1580 | 11 | 31 | 140 |
| 269 | 144 | 137 | 55 | 1110 | 12 | 20 | 97 |
| | | | 2nd RUN | | | | |
| 44.2 | 21.6 | 20.5 | N.O. | 2040 | N.O. | — | — |
| 189 | 92.4 | 88.0 | 20 | 1410 | 5.8 | 69 | 240 |
| 321 | 156 | 149 | 35 | 1070 | 6.7 | 31 | 160 |

*N.O. = not observed

EXAMPLE 6

An Immobilized Tetraethylammonium Acetate Tetrahydrate, $(C_2H_5)_4N^+CH_3CO_2^- \cdot 4H_2O$, (TEAA), Molten Salt Hydrate Membrane for the Separation of Water Vapor from $N_2$.

The salt hydrate, tetraethylammonium acetate tetrahydrate, $(C_2H_5)_4N^+CH_3CO_2^- \cdot 4H_2O$, (TEAA), in the molten state (>42° C.) was used to fabricate a membrane which separates $H_2O$ vapor from $N_2$. This membrane was prepared in the following manner. Molten TEAA was applied to a piece of Celgard 3501 and the excess salt was removed. The TEAA/Celgard was placed in a holder and sealed in a membrane test cell and heated to 50° C. The feed gas, was passed through a water bubbler at 25° C. The results are reported in Table VI below.

TABLE VI

| FEED GAS FLOW: 20 SCCM | | PERMEATE GAS He FLOW: 10 SCCM; P = 76 cm | | | |
|---|---|---|---|---|---|
| $P_{N_2}$ (cmHg) | $P_{H_2O}$ (cmHg) | $P_{H_2O}$ (cmHg) | $P_oH_2O$ (Barrers) | $P_oN_2$ (Barrers) | $\alpha H_2O/N_2$ |
| 73 | 2.35 | 1.35 | 22,400 | 7 | 4700 |

It is evident that there is a high flux of $H_2O$ through the membrane which results in a significant depletion of $H_2O$ from the feed gas stream (i.e., high $H_2O$ recoveries in the permeate stream). Hence, the approximation that the pressure of water in the permeate is near zero is not valid and $\Delta P_{H_2O}$ cannot be set equal to the pressure of water in the feed, $P_1$. Since the change in the pressure of water as a function of distance from the feed or sweep inlet is unknown, an average driving force, $\Delta P_{H_2O}$, was used in the calculation of $P_o(H_2O)$.

EXAMPLE 7

Encapsulated Tetraethylammonium Acetate Tetrahydrate, (TEAA), Molten Salt Hydrate Membranes for the Separation of Water Vapor from $N_2$.

This example describes the preparation and performance of a Celgard immobilized TEAA molten salt hydrate membrane which was encapsulated in polytrimethylsilylpropyne (PTMSP) (Run A), and in silicone rubber (Run B). A Celgard 3501 membrane was prepared as in Example 6. The membrane was placed between two films of PTMSP (134 and 140 μm thick), or two films of silicone rubber (127 μm thick), placed in a holder, sealed in a test cell and heated to 50° C. The feed gas, $N_2$, was passed through a water bubbler at 25° C. Dew point data was obtained as in Example 6. Flow rates of $H_2O$ and $N_2$ and the partial pressures of these components are reported in Table VII. Po values were calculated assuming only the TEAA/Celgard layer was responsible for gas permeation. As described in the previous example, an "average" $\Delta P_{H_2O}$ was used to calculate Po. The performance of the above encapsulated membrane systems and, as comparative examples, the corresponding data for PTMSP and silicone rubber polymer membranes, are listed in Table VII.

TABLE VII

PERFORMANCE OF ENCAPSULATED TEAA MELT HYDRATE MEMBRANES FOR THE SEPARATION OF WATER VAPOR FROM NITROGEN (AND COMPARATIVE EXAMPLES)

| Membrane System | FEED GAS FLOW: 20 SCCM | | PERMEATE GAS He FLOW: 10 SCCM; P = 76 cm | | | |
|---|---|---|---|---|---|---|
| | $P_{N_2}$ (cmHg) | $P_{H_2O}$ (cmHg) | $P_{H_2O}$ (cmHg) | $P_o(H_2O)$ (Barrers) | $P_o(N_2)$ | $\alpha H_2O/N_2$ |
| PTMSP/TEAA/Celgard ® (Run A) | 77 | 3.7 | 0.89 | 6,540 | 10 | 650 |
| Silicone Rubber/ | 77 | 3.5 | 0.74 | 5,600 | 12 | 500 |

TABLE VII-continued

PERFORMANCE OF ENCAPSULATED TEAA MELT HYDRATE MEMBRANES
FOR THE SEPARATION OF WATER VAPOR FROM NITROGEN
(AND COMPARATIVE EXAMPLES)

| Membrane System | FEED GAS FLOW: 20 SCCM | | PERMEATE GAS He FLOW: 10 SCCM; P = 76 cm | | | |
|---|---|---|---|---|---|---|
| | $P_{N_2}$ (cmHg) | $P_{H_2O}$ (cmHg) | $P_{H_2O}$ (cmHg) | $P_o(H_2O)$ (Barrers) | $P_o(N_2)$ | $\alpha\ H_2O/N_2$ |
| TEAA/Celgard ®  (Run B) | | | | | | |
| PTMSP | 77 | 3.6 | 1.20 | 9,900 | 7,630 | 1.3 |
| Silicone Rubber | 74 | 2.4 | 1.31 | 20,500 | 845 | 25 |

It is evident that encapsulated melt hydrate membranes can be prepared which are very effective for the separation of water vapor from nitrogen. The polymers PTMSP and silicone rubber also have very high permeabilities for water vapor, but are much poorer barriers for the permeation of $N_2$ than the melt hydrate membranes as can be seen by comparing the selectivity measurements set out above.

EXAMPLE 8

An immobilized molten salt hydrate membrane consisting of Calcium Nitrate Tetrahydrate plus and Silver Nitrate; $Ca(NO_3)_2.4H_2O + 0.2AgNO_3$ for the separation of $CH_2=CH_2$ from $CH_3CH_3$.

Calcium Nitrate tetrahydrate (obtained from Fisher Scientific Company) in the molten state (M.P.=39°–43° C.) and silver nitrate (obtained from Alfa Products) were used to fabricate an immobilized molten salt hydrate membrane to separate $CH_2=CH_2$ from $CH_3CH_3$. This membrane was prepared in the following manner. A 0.2 molar amount of silver nitrate was added to molten calcium nitrate tetrahydrate. Upon cooling to room temperature, a molten mixture was obtained. Molten $Ca(NO_3)_2.4H_2O/0.2\ AgNO_3$ was applied to a piece of Celgard ®3401 and the excess salt was removed. The $Ca(NO_3)_2.4H_2O/0.2AgNO_3$/Celgard ® was placed in a holder and sealed in a permeation cell and heated at 23° C. The feed gas, 1:1 ethylene:ethane, and the sweep gas, He, were passed through water bubblers at 23° C. Experimental conditions and membrane performance data are listed in Table VIII below.

TABLE VIII

Performance of Immobilized Calcium Nitrate Tetrahydrate/
AgNO3/Celgard ® molten salt hydrate membranes for the
separation of ethylene from ethane at 23° C.

| Feed Gas Flow: 20 sccm | | Permeate Gas He Flow: 10 sccm P = 76 cmHg | | |
|---|---|---|---|---|
| $P_{CH_2=CH_2}$ (cmHg) | $P_{CH_3CH_3}$ (cmHg) | $P_o CH_2=CH_2$ (Barrers) | $P_o CH_3CH_3$ (Barrers) | $\alpha\ CH_2=CH_2/CH_3CH_3$ |
| 132.1 | 132.1 | 68.2 | 14.4 | 4.7 |

EXAMPLE 9

An immobilized molten salt hydrate membrane consisting of Tetraethylammonium Acetate Tetrahydrate (TEAA) for the separation of $H_2S$ from $CH_4$.

Tetraethylammonium Acetate Tetrahydrate in the molten state was used to fabricate a membrane which separates $H_2S$ from $CH_4$. The membrane was prepared in the folloing manner. Molten TEAA was applied to a piece of Celgard ®3401 and the excess salt was removed with a glass slide. The TEAA/Celgard° was placed in a holder and sealed in a permeation cell and heated at 50° C. The feed gas, 5% $H_2S$:95% $CH_4$, was fed to the membrane dry. The sweep gas helium, was passed through a water bubbler at room temperature. Experimental conditions and membrane performance data are listed in Table IX.

TABLE IX

Performance of Immobilized Tetraethylammonium Acetate
Tetrahydrate/AgNO3/Celgard ® Molten Salt Hydrate
Membranes for the separation of $H_2S$ from $CH_4$ at 50° C.

| Feed Gas Flow: 20 sccm | | Permeate Gas He Flow: 10 sccm P = 76 cmHg | | |
|---|---|---|---|---|
| $P_{H_2S}$ (cmHg) | $P_{CH_4}$ (cmHg) | $P_o H_2S$ (Barrers) | $P_o CH_4$ (Barrers) | $\alpha\ H_2S/CH_4$ |
| 3.8 | 72.2 | 2710 | 6.5 | 420 |

EXAMPLE 10

An immobilized molten salt hydrate membrane consisting of Tetramethylammonium Fluoride Tetrahydrate (TMAF) for the separation of $H_2S$ from $CH_4$.

Tetramethylammonium Fluoride Tetrahydrate in the molten state was used to fabricate a membrane which separates $H_2S$ from $CH_4$. The membrane was prepared in the following manner. Molten TMAF was applied to a piece of Celgard ®3401 and the excess salt was removed with a glass slide. The TMAF/Celgard ® was placed in a holder and sealed in a permeation cell and heated at 50° C. The feed gas. 5% $H_2S$:95% $CH_4$, was fed to the membrane dry. The sweep gas, helium, was passed through a water bubbler at room temperature. Experimental conditions and membrane performance data are listed in Table X.

TABLE X

Performance of Immobilized Tetramethylammonium Fluoride
Tetrahydrate/Celgard ® Molten Salt Hydrate Membranes for
the separation of $H_2S$ from $CH_4$ at 50° C.

| Feed Gas Flow: 20 sccm | | Permeate Gas He Flow: 10 sccm P = 76 cmHg | | |
|---|---|---|---|---|
| $P_{H_2S}$ (cmHg) | $P_{CH_4}$ (cmHg) | $P_o H_2S$ Barrers | $P_o CH_4$ Barrers | $\alpha\ H_2S/CH_4$ |
| 3.8 | 72.2 | 2430 | 2 | 1200 |

Having thus described the present invention what is now deemed appropriate for Letters Patent is set out in the following appended claims.

What is claimed is:

1. A process for separating at least one component from at least one other component in a gaseous mixture, said process comprising passing the gaseous mixture over a membrane selectively permeable to the gas being separated, which membrane comprises a thin film of a molten salt hydrate.

2. A process in accordance with claim 1 wherein the molten salt hydrate is immobilized within the pores of a thin, porous, inert support.

3. A process in accordance with claim 1 wherein the molten salt hydrate is encapsulated in a non-porous, gas permeable, polymer or polymer blend material.

4. A process in accordance with claim 3 wherein the non-porous, gas permeable polymer material is poly(4-methyl-1-pentene), poly(trimethylsilylpropyne) or silicone rubber.

5. A process in accordance with claim 1 wherein the molten salt hydrate contains between about 1–12 moles of $H_2O$ per mole of salt.

6. A process in accordance with claim 5 wherein water is added either directly as a liquid or by humidification of the feed stream to the molten salt hydrate.

7. A process in accordance with claim 1 wherein $CO_2$ is separated from a gas mixture comprising $CO_2$, $CH_4$ and $H_2$.

8. A process in accordance with claim 7 wherein said molten salt hydrate is selected from the group consisting of Tetramethylammonium Fluoride Tetrahydrate, Tetraethylammonium Acetate Tetrahydrate and mixtures thereof.

9. A process in accordance with claim 1 wherein water vapor is separated from a gaseous mixture comprising water vapor and nitrogen.

10. A process in accordance with claim 1 wherein said molten salt hydrate comprises a cationic species, an anionic species and water.

11. A process in accordance with claim 10 wherein the cationic species can reversibly bind the component that is to be separated from the gaseous mixture.

12. A process in accordance with claim 10 wherein said anionic species is a basic anion selected from the group consisting of: acetate. trifluoroacetate, formate, benzoate, glycinate, fluoride, carbonate, sulfite, sulfide and hydrogen sulfide.

13. A process in accordance with claim 1 wherein said gaseous component which is separated from the gaseous mixture is selected from the group consisting of: $CO_2$, $SO_2$, $NH_3$, HF, HCl, HBR, $H_2S$, $C_2H_4$, $C_3H_6$, and mixtures thereof.

14. A process in accordance with claim 1 wherein $H_2S$ is separated from a gaseous mixture comprising $CH_4$ and $H_2$.

15. A process in accordance with claim 1 wherein olefin gases are separated from a gaseous mixture comprising olefins and alkanes.

16. A membrane which is selectively permeable for at least one gaseous component of a gaseous mixture containing at least one other component, said membrane comprising a molten salt hydrate immobilized or encapsulated in, or supported on, an inert support material.

17. A membrane in accordance with claim 16 wherein the molten salt hydrate is immobilized within the pores of a thin, porous, inert support.

18. A membrane in accordance with claim 16 wherein the molten salt hydrate is encapsulated in a non-porous, gas permeable, polymer or polymer blend material.

19. A membrane in accordance with claim 18 wherein the non-porous, gas permeable polymer material is poly(4-methyl-1--pentene), poly(trimethylsilylpropyne) or silicone rubber 20. A membrane in accordance with claim 16 wherein the molten salt hydrate contains between about 1–12 moles of $H_2O$ per mole of salt.

21. A membrane in accordance with claim 16 wherein $CO_2$ is separated from a gas mixture comprising $CO_2$, $CH_4$ and $H_2$.

22. A membrane in accordance with claim 21 wherein said molten salt hydrate is selected from the group consisting of Tetramethylammonium Fluoride Tetrahydrate, Tetramethylammonium Acetate Tetrahydrate and mixtures thereof.

23. A membrane in accordance with claim 16 which is capable of separating water vapor from a gaseous mixture comprising water vapor and nitrogen.

24. A membrane in accordance with claim 16 wherein said molten salt hydrate comprises a cationic species, an anionic species and water.

25. A membrane in accordance with claim 24 wherein said anionic species is a basic anion selected from the group consisting of: acetate, trifluoroacetate, formate, benzoate, glycinate, fluoride, carbonate, sulfite, sulfide and hydrogen sulfide.

26. A membrane in accordance with claim 16 which is selectively permeable to a gaseous component of a gaseous mixture, said component being selected from the group consisting of: $CO_2$, $SO_2$, $NH_3$, HF, HCl, HBr, $H_2S$, $C_2H_4$, $C_3H_6$, and mixtures thereof.

* * * * *